(12) United States Patent
Moran (10) Patent No.: US 7,157,133 B2
(45) Date of Patent: Jan. 2, 2007

(54) EMBOSSED REFLECTIVE LAMINATES

(75) Inventor: James R Moran, Longmeadow, MA (US)

(73) Assignee: Solutia Incorporated, St. Louis, MO (US)

( * ) Notice: Subject to any disclaimer, the term of this patent is extended or adjusted under 35 U.S.C. 154(b) by 12 days.

(21) Appl. No.: 10/346,137

(22) Filed: Jan. 16, 2003

(65) Prior Publication Data

US 2003/0161997 A1 Aug. 28, 2003

Related U.S. Application Data

(60) Provisional application No. 60/360,316, filed on Feb. 28, 2002.

(51) Int. Cl.
*B32B 3/00* (2006.01)
*B32B 17/06* (2006.01)
*B32B 17/10* (2006.01)
*B32B 27/42* (2006.01)
*B32B 7/12* (2006.01)

(52) U.S. Cl. ............... 428/172; 428/156; 428/164; 428/161; 428/162; 428/426; 428/437; 428/457; 428/354; 428/343

(58) Field of Classification Search ............... 428/156, 428/161, 164, 162, 172, 426, 437, 457, 458, 428/354, 343, 355 R
See application file for complete search history.

(56) References Cited

U.S. PATENT DOCUMENTS

| | | | | |
|---|---|---|---|---|
| 3,661,686 A | * | 5/1972 | Armstrong | 428/164 |
| 3,956,559 A | * | 5/1976 | Wildorf | 428/214 |
| 4,173,672 A | | 11/1979 | Mannheim | 428/203 |
| 4,244,997 A | | 1/1981 | Postupack | 428/174 |
| 4,255,490 A | | 3/1981 | Katsura | 428/483 |
| 4,264,664 A | * | 4/1981 | Kunz | 428/142 |
| 4,278,736 A | | 7/1981 | Kamerling | 428/437 |
| 4,379,805 A | | 4/1983 | Downing et al. | 428/346 |
| 4,444,825 A | | 4/1984 | Vanderstukken et al. | 428/215 |
| 4,469,743 A | | 9/1984 | Hiss | 428/215 |
| 4,480,003 A | | 10/1984 | Edwards et al. | 428/329 |
| 4,537,828 A | | 8/1985 | Gomez | 428/412 |
| 4,574,136 A | | 3/1986 | Gomez | 524/310 |
| 4,642,255 A | | 2/1987 | Dlubak | 428/38 |
| 4,824,722 A | | 4/1989 | Jarrett | 428/430 |
| 4,842,389 A | | 6/1989 | Wood et al. | 350/3.7 |
| 4,847,237 A | | 7/1989 | Vanderzanden | 503/227 |
| 4,873,137 A | | 10/1989 | Deyrup | 428/216 |
| 4,902,670 A | | 2/1990 | Kanto et al. | 503/227 |

(Continued)

FOREIGN PATENT DOCUMENTS

BE 856 564 A 10/1977

(Continued)

*Primary Examiner*—Alicia Chevalier
*Assistant Examiner*—Catherine A. Simone
(74) *Attorney, Agent, or Firm*—Brenc Law (57) ABSTRACT

This invention provides an embossed decorative composite laminate interlayer for use in reducing UV and IR energy transmittance through a glass laminate. One interlayer of the present invention comprises an embossed decorative composite disposed between a first and second adhesive layer, such as PVB. The embossed decorative composite of the present invention comprises a first polymeric support film, such as PET, having a metal coating disposed thereon, thereby forming a metallized film. The metallized film is then bonded through the use of an adhesive to a second polymer support film, forming a decorative composite structure. The decorative composite is then purposefully embossed such that they have protrusions at different angles to the flat plane of the bonded polymeric support films, so as to form the desired embossed decorative composite.

49 Claims, 2 Drawing Sheets

U.S. PATENT DOCUMENTS

| | | | | |
|---|---|---|---|---|
| 4,925,713 A | 5/1990 | Kiryu et al. | ................... | 428/40 |
| 4,952,457 A | 8/1990 | Cartier et al. | ............ | 428/425.6 |
| 4,968,553 A | 11/1990 | Cesar | ......................... | 428/203 |
| 4,971,845 A | 11/1990 | Aaker et al. | ................ | 428/34.9 |
| 4,975,332 A | 12/1990 | Sjini et al. | .................. | 428/500 |
| 4,976,795 A | 12/1990 | Perotto | ...................... | 149/19.4 |
| 4,976,799 A | 12/1990 | Wood | ......................... | 156/106 |
| 5,010,672 A | 4/1991 | Coleman | ...................... | 40/615 |
| 5,024,895 A | 6/1991 | Kavanagh et al. | .......... | 428/437 |
| 5,049,433 A | 9/1991 | Leotta | ......................... | 428/195 |
| 5,066,525 A | 11/1991 | Nakamachi et al. | .......... | 428/29 |
| 5,069,962 A | 12/1991 | Okoazaki et al. | ........... | 428/323 |
| 5,082,738 A | 1/1992 | Swofford | .................... | 428/437 |
| 5,089,318 A | 2/1992 | Shetty et al. | ................ | 428/212 |
| 5,091,258 A | 2/1992 | Moran | ........................ | 428/437 |
| 5,153,062 A | 10/1992 | Grolig et al. | ............... | 428/336 |
| 5,169,694 A | 12/1992 | Endo et al. | ................... | 428/34 |
| 5,208,080 A | 5/1993 | Gajewski et al. | ............. | 428/1 |
| 5,209,972 A | 5/1993 | Super et al. | ................ | 428/349 |
| 5,229,217 A | 7/1993 | Holzer | ........................ | 428/503 |
| 5,252,533 A | 10/1993 | Yasuda et al. | .............. | 503/227 |
| 5,397,635 A | 3/1995 | Wood, Jr. | ................. | 428/314.4 |
| 5,418,026 A | 5/1995 | Dronzek, Jr. et al. | ......... | 428/40 |
| 5,443,869 A | 8/1995 | Harris | ......................... | 428/13 |
| 5,451,449 A | 9/1995 | Shetty et al. | ............... | 428/195 |
| 5,468,712 A | 11/1995 | Minato et al. | .............. | 503/227 |
| 5,500,274 A | 3/1996 | Francis et al. | .............. | 428/156 |
| 5,501,910 A | 3/1996 | Smith | ......................... | 428/447 |
| 5,529,848 A | 6/1996 | D'errico | ..................... | 428/413 |
| 5,529,849 A | 6/1996 | D'errico | ..................... | 428/415 |
| 5,567,529 A | 10/1996 | Smith | ...................... | 428/425.6 |
| 5,567,533 A | 10/1996 | Toney et al. | .............. | 428/475.5 |
| 5,595,794 A | 1/1997 | Cesar | .......................... | 428/13 |
| 5,602,457 A | 2/1997 | Anderson et al. | ............... | 320/2 |
| 5,604,019 A | 2/1997 | Bland et al. | ................. | 428/212 |
| 5,618,863 A * | 4/1997 | D'Errico et al. | .............. | 524/91 |
| 5,631,089 A | 5/1997 | Center, Jr. et al. | .......... | 428/437 |
| 5,677,024 A | 10/1997 | Abe et al. | ................... | 428/40.1 |
| 5,756,171 A | 5/1998 | Moteki et al. | ............. | 428/36.6 |
| 5,756,186 A | 5/1998 | Lievens et al. | ............. | 428/195 |
| 5,759,653 A | 6/1998 | Collette et al. | ............. | 428/35.9 |
| 5,796,095 A | 8/1998 | Matsuyama et al. | ...... | 250/208.1 |
| 5,882,774 A | 3/1999 | Jonza et al. | ................. | 428/212 |
| 5,922,424 A | 7/1999 | Igushi et al. | ................ | 428/35.9 |
| 5,932,239 A | 8/1999 | Horstmann et al. | ......... | 424/449 |
| 6,042,947 A | 3/2000 | Asakura et al. | ............. | 428/437 |
| 6,074,732 A | 6/2000 | Garnier et al. | .............. | 428/215 |
| 6,077,613 A | 6/2000 | Gaffigan | ..................... | 428/442 |
| 6,080,467 A | 6/2000 | Weber et al. | ................ | 428/212 |
| 6,086,983 A | 7/2000 | Yoshizawa | ................... | 428/215 |
| 6,096,410 A | 8/2000 | Okajima et al. | ............. | 428/195 |
| 6,143,387 A * | 11/2000 | Kubler et al. | ............... | 428/41.7 |
| 6,235,374 B1 | 5/2001 | Miki et al. | ................... | 428/201 |
| 6,329,061 B1 | 12/2001 | Kondo | ........................ | 428/432 |
| 6,372,352 B1 | 4/2002 | Bletsos et al. | .............. | 428/441 |
| 6,620,872 B1 * | 9/2003 | Fisher | ........................ | 524/403 |

FOREIGN PATENT DOCUMENTS

| | | |
|---|---|---|
| RU | 2039661 | 7/1995 |
| RU | 2057093 | 3/1996 |
| RU | 2134200 | 8/1999 |

* cited by examiner

EMBOSSED REFLECTIVE LAMINATES

BACKGROUND

The invention relates to the use of shatterproof laminated window assemblies having high reflection of solar radiation in combination with a unique visual appearance not previously found for use in architectural and automotive applications.

The surface areas of automotive glass have increased in recent years because of the popularity of new Sport Utility Vehicles (SUV's) in the United States and elsewhere which has resulted in the need to reduce vehicle solar heat load. In addition, there has been a strong interest for increased vehicle privacy to improve personal security. Because the rear and back glass as well as sunroofs for such vehicles are usually controlled by less restrictive government regulatory rules on visible light transmittance, high performance heat reflecting and/or heat absorbing glass with accompanying low visible light transmittance and with limited aesthetic options has grown in use.

In architectural building applications metal-coated glass with high visible reflectance is not desirable because of the objectionable "mirror-like" reflections. Furthermore, in some high building density city regions such glass is not allowed by building codes because of the impact of reflected light onto nearby structures.

The present invention relates to encapsulated solar reflecting films for use in laminated window assemblies and more particularly to shatterproof window assemblies having a safety glass type of construction. Solar reflecting window assemblies have found application in numerous applications where one objective is to manage internal heat loads by reflecting the near infrared portion of the solar spectrum which causes heating. This type of technology has been employed, for example, in commercial and residential glazing products as well as automotive window products.

To reduce the heating effects resulting from such windows, selective light transmitting materials or films have been incorporated into window assemblies. These films have generally been designed to maximize rejection of incoming light in the near infrared wavelength range, maximize visible light transmittance and minimize visible light reflectance. Selective light transmitting films are disclosed, for example, in U.S. Pat. No. 4,973,511.

Angstrom-thick (or thicker) layers of metals, metal compounds, and the like in windows to reflect heat-producing infrared solar radiation while transmitting significant cooler visible light are well known. Temperature increase is reduced within an area delimited by one or more of such windows. These layers usually arranged in sequence as stacks, and are carried by an appropriate transparent planar polymeric support layer, such as biaxially stretched, thermoplastic polyethylene terephthalate film (PET) or equivalent material. As used hereinafter, the polymeric support layer having the metal coating will collectively be referred to as a "metallized film."

When a metallized film is combined with glass in a laminated safety glazing, two layers of a shock-dissipating interlayer of plasticized polyvinyl butyral (PVB) are usually included to absorb a blow from a foreign object without penetrating the glass. As disclosed in U.S. Pat. No. 5,091,258, the contents of which are herein incorporated by reference, a metal coating is disposed onto a flexible plastic substrate such as PET (forming a metallized film) and is encapsulated within two layers of plasticized PVB. This multi-layered laminate with PVB as the outer layers is then laminated between two rigid transparent members such as glass to form the safety glazing which, by virtue of the presence of the metallized film, reduces solar radiation transmission.

Any nonplanar distortions of the metallized film in the laminate structure have been recognized in the prior art as being problematic, and, when pronounced, have been labeled as 'defects' that render the glass laminate commercially unacceptable. These 'defects' are visually apparent because there is almost always a small amount of visible light being reflected from the surface of the metallized film. The '511 patent sought to reduce this 'defect' by designing the metallized film to minimize visible reflectance at the PVB/metallized film interface so as to significantly reduce an observer's ability to see the optical 'defects' present in the glass laminate.

Another attempt to deal with this optical 'defect' is described in U.S. Pat. No. 4,465,736, which also sought to minimize surface deformities in the metallized film. The '736 patent discloses a solar reflecting metal/dielectric stack, therein called a coating, disposed onto a special substrate designed to be heat shrinkable within certain carefully pre-chosen limits. Furthermore, U.S. Pat. No. 5,932,329 discloses a laminated glass pane containing an IR-reflecting surface coating. The '329 patent noted that such laminated glass panes frequently exhibited a disturbing optical quality defect or optical distortion, wherein the IR-reflecting surface does not appear uniform in reflection, but exhibits a shrinkage effect or even a hammering or wrinkling effect. The '329 patent set out to remedy this problem by completely or nearly completely avoiding optical distortion by minimizing the shrinkage of the IR-reflecting surface, so as to prevent deformities or the IR-reflecting surface.

Virtually no prior art process is capable of reducing every surface deformity in the IR-reflecting surface. Because a flat mirror-like surface is very difficult to obtain, it would be desirable to develop a glass laminate structure that could advantageously use surface deformities of the IR-reflecting surface.

SUMMARY OF THE INVENTION

This invention provides an embossed decorative composite laminate interlayer for use in reducing UV and IR energy transmittance through a glass laminate. One interlayer of the present invention comprises a structure having two outside adhesive layers, such as PVB, and two inside polymeric support layers, such as PET. One polymer support layer preferably has a thin metal coating with high visible reflectance disposed thereon, forming a metallized film. The metallized film is then bonded through the use of an adhesive to a second polymer support layer, forming a decorative composite structure. The decorative composite is then purposefully embossed to form an embossed decorative composite. The surface deformities that have purposely been added to the metallized film can be easily observed. This contrasts common practice that seeks to minimize surface deformities in the metallized film layer and to reduce its visible reflectance of the metal coating.

DETAILED DESCRIPTION OF ILLUSTRATED EMBODIMENTS

The invention disclosed herein describes an embossed decorative composite for use as an interlayer for a glass laminate comprising an textured multilayer structure with a metal coating disposed between two polymeric supports. This embossed decorative composite can then be disposed between two adhesive layers to form the resultant interlayer. The interlayer can then be disposed between two sheets of glass, thereby forming a final glass laminate product.

Figure 1:
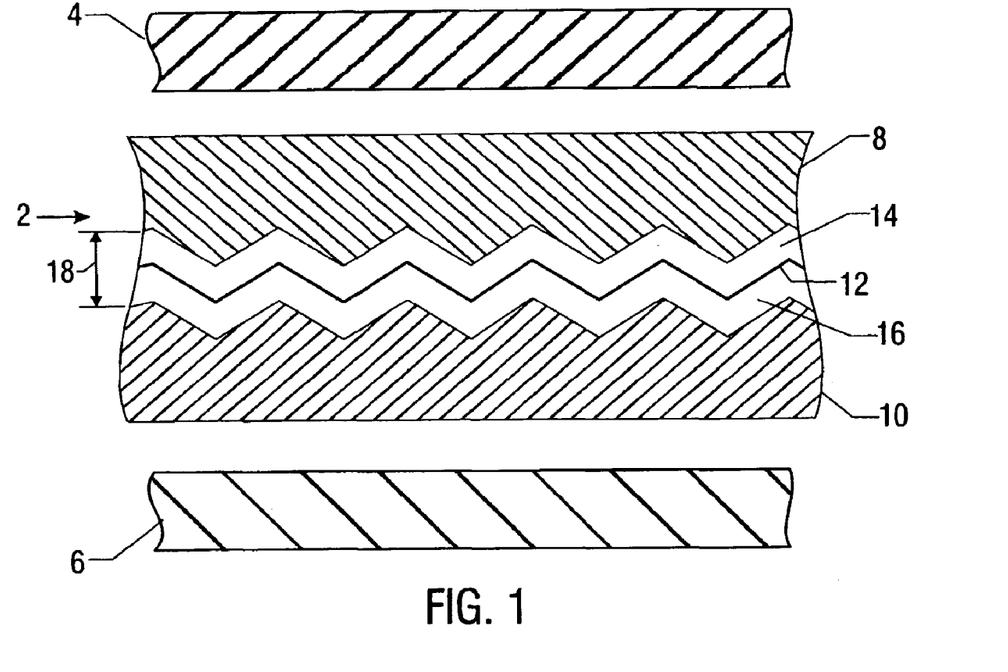
FIG. 1 is a partial, sectional view in enlarged detail of a laminate according to the present invention shown in spaced association with glass layers of a safety glazing.
Figure 2:
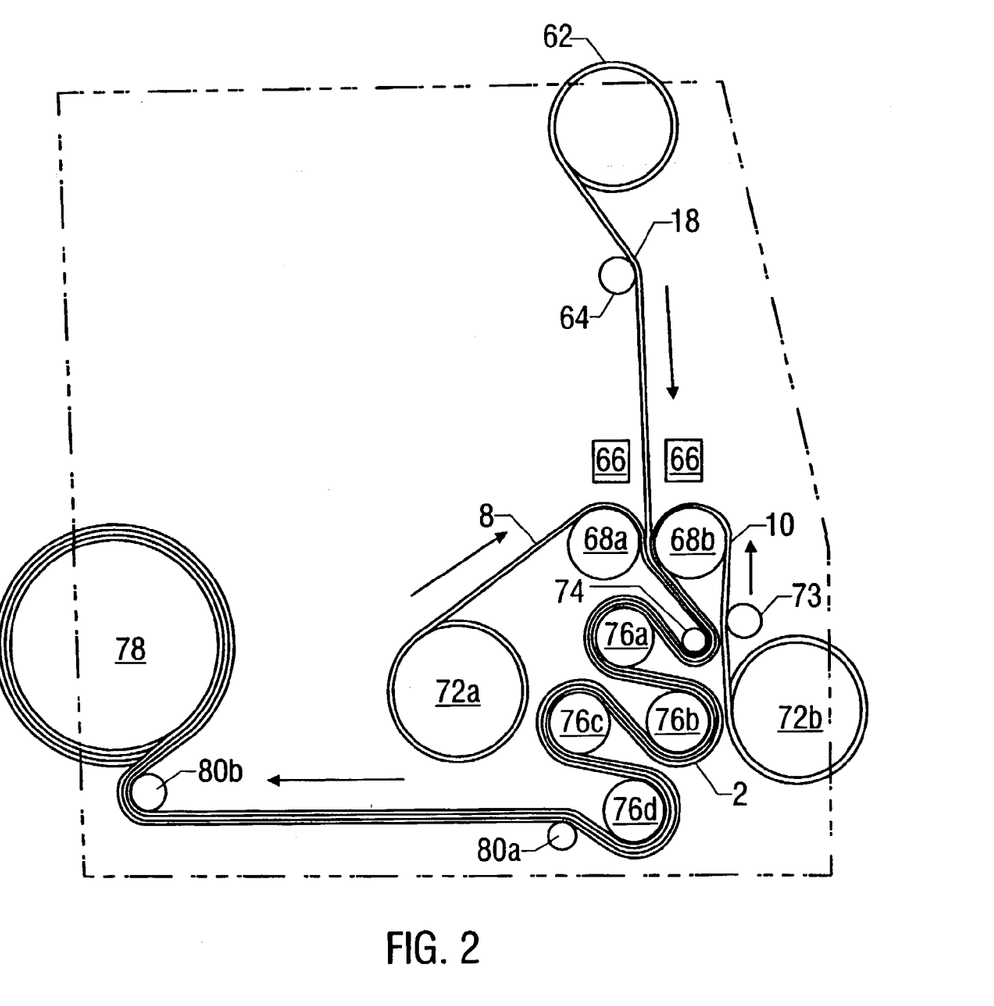
FIG. 2 is a representative apparatus for forming the laminate of FIG. 1.

Referring to FIG. 1, laminate 2 is shown in FIG. 1 for use with one or more rigid transparent layers, such as, glass sheets 4 and 6 in an optically transparent safety glazing for controlling solar radiation. In the embodiment of FIG. 1, a safety glazing comprises laminate 2 firmly bonded to opposing glass sheets 4 and 6, which for clarity are shown spaced from laminate 2. Laminate 2 comprises two adhesive layers 8 and 10, preferably PVB, and embossed decorative composite 18. Embossed decorative composite 18 is also shown in FIG. 2. Embossed decorative composite 18 comprises two polymeric support layers 14 and 16, preferably PET. One of such polymeric support layers has a thin metal coating 12 disposed thereon, and is bonded to the other polymeric support layer using an adhesive.

At the center of the embossed decorative composite of the present invention is the use of a thin metal coating disposed onto a polymeric support layer, forming a metallized film. The metallized film is then bonded with an adhesive to a second polymeric support layer, forming a decorative composite. The decorative composite is embossed, and thus reflects infrared solar radiation and a large portion of visible light when exposed to sunlight in a safety glazing. The embossed decorative composite of the present invention does not completely reflect all visible light, as some visible light transmittance is necessary for the use of the present invention in automotive glass and architectural building applications. The embossed decorative composite of the present invention preferably has a visible light transmittance ranging from about 2% to about 70%. Generally, the thicker the metal coating in the metallized film, the lower the visible transmittance/higher visible reflection. Among the suitable metals for use in the metal coating are silver, aluminum, chromium, nickel, zinc, copper, tin, gold and alloys thereof as well as other alloys such as brass and stainless steel. The preferred metal of the present invention is aluminum.

Unlike prior art films that are used in laminated glass, the decorative composite of the present invention is purposefully textured, such as being embossed in a pattern so that there are protrusions of the embossed decorative composite at different angles to the normal, flat plane of the decorative composite. Such protrusions can be in a regular pattern, such as regular diamond like protrusions as described in U.S. Pat. No. 4,343,848, or irregular or random pattern, such as one that is commonly known as 'orange peel.' Other textures can also be used, and are within the scope of this invention. Such other textures could range from simple repeating patterns to corporate logos, for instance, depending on the needs and wants of the final end user of the glass laminate product.

The textured surface pattern of the embossed decorative composite greatly reduces the glare and the visibility of any surface deformities in laminates that are normally associated with such films. As described above, any surface deformities on non-embossed metallized films in glass laminates have been recognized in the prior art as being problematic, and, when pronounced, have been labeled as 'defects' that render the glass laminates commercially unacceptable. These 'defects' are visually apparent because visible light is reflected from the surface of the metallized film within the glass laminate.

Furthermore, highly reflective flat metallized films are generally more unattractive because of the ease in which the general nonplanarity of the metallized film within the laminate can be observed. The effects of these shortcomings are optically non-uniform surfaces that result in distorted reflected images. Using embossed metallized films with high visible reflectance eliminates these problems, as a uniformly textured surface hides defects in the metallized film and results in a very diffuse reflected image that is aesthetically more appealing than the above described mirror-like appearance that is encountered with flat reflective films.

To form the embossed decorative composite of the present invention, a metal coating is first disposed on a polymeric support layer. This can be done through a variety of means, such as a vacuum metallizing process including evaporation and sputtering or other treatments well known to those of ordinary skill in the art. The polymeric support layer with the metal coating disposed thereon generally needs to be laminated to a second polymeric support layer through the use of an adhesive. This is preferred so as to minimize any surface oxidation of the metal coating. If not laminated within a short period of time, the visible transmittance of the metallized film will increase significantly due to the aforementioned surface oxidation.

The adhesive used for bonding the multiple polymeric support films to form the decorative composite should be compatible with the high temperatures (upwards of 150° C.) utilized during typical autoclave laminate processing. The adhesive should also retain its adhesive properties throughout processing (embossing+laminating steps) so as to ensure adequate polymeric support film interply adhesion. Acceptable adhesives include any crosslinked adhesive system such as polyesters, urethanes, acrylics, etc. with the preferred adhesive being an isocyanate crosslinked polyester.

In order to form the embossed decorative composite, the decorative composite (polymer support layer-metal coating-adhesive-polymer support layer) preferably is subjected to a nip roll embossing process that is known well in the art. This process involves the use of a two cylindrical rollers, one of which has a soft surface and the other one has a hard surface with an engraved texture. The decorative composite is usually preheated using either IR or convection heating prior to embossing in order to soften the polymer and make it more compliant during the embossing process. The decorative composite is transported through the nip and using sufficient heat and pressure, the texture of the engraved roll is imparted onto its surface forming the embossed decorative composite. The temperature/pressure employed during the embossing of the decorative composite is usually very important in determining permanence of the imparted texture and its appearance in the autoclaved laminate.

The polymeric support films of the present invention should have properties to maintain its integrity during handling and deposition of the metallized film on its surface, as well as during subsequent bonding and laminating steps. Furthermore, the polymeric support films should have properties sufficient to be an integral part of the final safety-glazing product. To satisfy such performance requirements, the polymeric support film should be optically transparent (i.e. objects adjacent one side of the layer can be comfortably seen by the eye of a particular observer looking through the layer from the other side). The polymeric support film usually has a greater, preferably significantly greater, tensile modulus than that of the outside adhesive layers.

Among thermoplastic materials having these physical properties, and therefore suitable as the polymeric support film, are nylons, polyurethanes, acrylics, polycarbonates, cellulose acetates and triacetates, vinyl chloride polymers and copolymers and the like. Most preferred is polyethylene terephthalate (PET) which has been biaxially stretched to improve strength and which has been heat stabilized to provide low shrinkage characteristics when subjected to elevated temperatures (i.e. less than 2% shrinkage in both directions after 30 min. Exposure at 150° C.). The tensile modulus (at 21–25° C.) of polyethylene terephthalate is about $10^{10}$ Pa as compared with about $10^7$ Pa for plasticized polyvinyl butyral (the preferred adhesive layer of the present invention) of the type used in safety glazings. The preferred thickness of the individual polymeric support layers is about 0.025 to about 0.075 mm (about 1 to 3 mils).

It is possible to color the polymeric support layers using organic dyes so as to change the aesthetic appearance of the glass laminate structure. However, color stability of these organic dyes is usually poor when exposed to UV light. As will be described later, in one embodiment of the present invention, the adhesive layers that surround the polymeric support layers can be colored with pigments that are considerably more stable to UV light and which can deliver additional laminate aesthetics. Once the decorative layer is properly constructed, formation of the final laminate product can begin. One embodiment of the final glass laminate product provides for the embossed decorative composite layer to be placed between two adhesive layers. The surface layers of the embossed decorative composite layer, usually the polymeric support layers (PET), in contact with the adhesive layers preferably are appropriately coated and/or treated to achieve adequate adhesion and laminate integrity. Preferred techniques are roughening of the surface of the decorative layer or by chemical modification of the embossed decorative composite layer surface. Such modification can be effected by flame treatment, chemical oxidation, corona discharge, carbon sputtering, plasma treatment in vacuum or in air, application of an adhesive, or other treatments well known to those of ordinary skill in the art.

Adhesive layers that can be utilized with the present invention include polyurethane, ethylene vinyl acetate copolymer, plasticized polyvinyl chloride as well as other elastomeric polymers with energy absorbing properties and surface chemistry to provide adequate adhesion to glass and the polymeric support layers. The preferred adhesive layer of the present invention is plasticized polyvinyl butyral (PVB). PVB resin generally is produced by known aqueous or solvent acetalization processes reacting PVOH with butyraldehyde in the presence of acid catalyst, followed by neutralization of the catalyst, separation, stabilization and drying of the resin. PVB resin is commercially available from Solutia, Inc. as Butvar® resin. PVB resin typically has a weight average molecular weight greater than 70,000, preferably about 100,000 to 250,000, as measured by size exclusion chromatography using low angle laser light scattering. On a weight basis PVB typically comprises less than 22%, preferably about 17 to 19% hydroxyl groups calculated as polyvinyl alcohol (PVOH); up to 10%, preferably 0 to 3% residual ester groups, calculated as polyvinyl ester, e.g. acetate, with the balance being acetal, preferably butyraldehyde acetal, but optionally including a minor amount of acetal groups other than butyral, for example 2-ethyl hexanal as disclosed in U.S. Pat. No. 5,137,954.

The PVB resin of the sheet is typically plasticized with about 15 to 50 and more commonly 25 to 45 parts plasticizer per hundred parts of resin. Plasticizers commonly employed are esters of a polybasic acid or a polyhydric alcohol. Suitable plasticizers are triethylene glycol di-(2-ethylbutyrate), triethyleneglycol di-(2-ethylhexanoate), tetraethyleneglycol diheptanoate, dihexyl adipate, dioctyl adipate, mixtures of heptyl and nonyl adipates, dibutyl sebacate, polymeric plasticizers such as the oil-modified sebacic alkyds, and mixtures of phosphates and adipates such as disclosed in U.S. Pat. No. 3,841,890 and adipates and alkyl benzyl phthalates as disclosed in U.S. Pat. No. 4,144,217. Also mixed adipates made from $C_4$ to $C_9$ alkyl alcohols and cyclo $C_4$ to $C_{10}$ alcohols as disclosed in U.S. Pat. No. 5,013,779. $C_6$ to $C_8$ adipate esters such as hexyl adipate are preferred plasticizers. A more preferred plasticizer is triethylene glycol di-(2-ethylhexanoate).

It is often desirable to add an infrared (IR) light absorber to one or both adhesive layers in order to reduce the solar energy that is transmitted through the laminate. It is known that nanoparticles of various inorganic oxides can be dispersed within a resin binder to form coatings or layers that absorb particular wavelength bands of infrared energy but allow high levels of transmission of visible light. In particular, U.S. Pat. No. 5,807,511 discloses that coatings containing antimony doped tin oxide (ATO) have a very low transmittance to IR light having wavelengths exceeding 1400 nanometers. U.S. Pat. No. 5,518,810 describes coatings containing tin doped indium oxide (ITO) particles that substantially block infrared light having wavelengths above 1000 nanometers and that the crystal structure of ITO can also be modified to block light having wavelengths in the 700–900 nanometer range.

European Patent Application EP-A-1008564 discloses the use of an IR blocking coating composition which contains both ATO or ITO, and a metal hexaboride such as lanthanium hexaboride (LaB6). The ITO or ATO blocks the higher wavelengths of IR light and the metal hexaboride particles block the lower wavelengths of light without significant effects on the visible light portion of the solar spectrum. As described earlier for optimized solar performance in laminated glass applications it is desirable to maximize visible transmittance (Tv) and minimize overall solar transmittance (Ts). Such transmittances can be measured using a Perkin-Elmer Lambda 900 spectrophotometer with a 150 mm diameter integrating sphere, and are calculated using the D65 Illuminant with 10° observer and following the ISO 9050 (air mass 2) standard. The ratio of Tv to Ts (Tv/Ts) is sometimes used to evaluate such performance.

It is usually best to reflect as much IR radiation as possible before absorbing the remaining IR radiation. IR absorption will result in a temperature increase of the glass laminate, and thus some solar energy will be transferred from the glass surface to the enclosed compartment, such as an automobile, through convective heat transfer. The preferred construction for the inventive interlayer would have one or more of the previously described IR absorbers in the adhesive layer furthest removed from the sun.

It is also often useful or desirable to incorporate a UV absorber into PVB. One such UV absorber is disclosed in U.S. Pat. No. 5,618,863, the contents of which are incorporated herein by reference. The amount of UV absorber added to the PVB can vary and is generally from 0.1 to 1 part per 100 parts PVB. Sandwiching the embossed decorative composite between two colored adhesive layers containing a UV absorber eliminates the need to include these expensive components in the polymeric support layer. In the preferred case when PET film is used as the polymeric support layers, the addition of the UV absorber is essential so that there is no degradation of the PET polymer.

In addition to plasticizer, optional UV absorber and adhesion control agent, PVB sheet may contain other performance-enhancing additives such as pigments or dyes for coloring all or part of the sheet, antioxidants and the like.

Plasticized PVB as sheet at a non-critical thickness of about 0.38 to 1.5 mm (about 15–60 mils) may be formed by mixing resin and plasticizer plus additives and preferably (in commercial systems) extruding the mixed formulation through a sheet die, i.e., forcing molten, plasticized PVB through a horizontally long vertically narrow die opening substantially conforming in size to the sheet being formed. Roughness of the surface of the sheet is usually produced through a phenomenon known to those skilled in the art as melt fracture and such desired characteristics can be derived by design of the extrudate die opening as shown, for example, in FIG. 4 of U.S. Pat. No. 4,281,980. Other known techniques for producing a rough surface on one or more sides of an extruding sheet involve, specifying or controlling one of the following: polymer molecular weight distribution, water content and temperature of the melt. These techniques are disclosed in U.S. Pat. Nos. 2,904,844; 2,909,810; 3,994,654; 4,575,540 and European Patent No. 0185,863. Embossing of the sheet downstream of the die can also be used to produce the desired surface roughness. Examples of embossed PVB sheets with regular patterned surfaces are described in U.S. Pat. Nos. 5,425,977 and 5,455,103. This PVB surface roughness is needed to facilitate the de-airing of the glass/PVB interface and is completely eliminated during subsequent autoclave lamination. The final laminate of the present invention may be formed using a lamination process known in the art.

Referring to FIG. 2, a process will be described for forming laminate 2 for use in a safety glazing such as a vehicle or building window, skylight, sunroof or the like. FIG. 2 illustrates a nip roll press-bonding system for encapsulating the embossed decorative composite layer 18 within PVB layers 8 and 10. The embossed decorative composite layer 18 from roll 62 is passed over tension roll 64 and subjected to moderate surface heating in stations 66 positioned to gently heat either decorative layer 18, plasticized PVB sheets 8 and 10, or both. Heating is to a temperature sufficient to promote temporary fusion bonding in that the thermally softened surfaces of layers 8 and 10 become tacky. When the polymeric support layers of decorative layer 18 are the preferred biaxially oriented polyethylene terephthalate, suitable temperatures are from about 30° C. to about 120° C., with the preferred surface temperature reaching about 50° C.

Embossed decorative composite layer 18 and layers 8 and 10, each having roughened de-airing surfaces, are directed into the laminating nip between oppositely rotating press rolls 68a, 68b where the three layers are merged together. This expels the air between the layers, and for embossed metallized films with high profiles this process step is critical because it is essential to remove as much air as possible from between the layers. The result of this merging is the encapsulation of decorative layer 18 within PVB layers 8 and 10 to form the lightly bonded laminate 2 of FIG. 1, without flattening the outer unbonded de-airing surfaces of layers 8 and 10. Layers 8 and 10 are supplied from rolls 72a, 72b and a tension roll 73 can be included in the PVB layer supply line. If desired, press rolls 68a, 68b can be optionally heated to promote bonding. Bonding pressure exerted by press rolls 68a, 68b can be varied depending on the carrier film material chosen and bonding temperature employed but generally will range from about 0.7 to 5 kg/sq cm, preferably about 1.8–2.1 kg/sq cm. The tension of laminate 2 is controlled by passage over idler roll 74. Typical line speeds through the FIG. 2 assembly are from 5 to 30 ft/min (1.5 to 9.2 m/min).

The laminate 2 of the present invention will most commonly be disposed between to sheets of glass, preferably a pair of matching float glass sheets. The glass sheets can be any combination of any types of glass, including both clear glass and tinted glass, and including annealed, heat strengthened or tempered glass. The composite laminate of the present invention has the advantage that it can be used in the same manner and laminated employing the same equipment as that employed in forming conventional safety glass laminates, for example, process forming a safety glass laminate containing a single layer PVB safety film. The typical commercial safety glass lamination process comprises the following steps:

(1) hand assembly of the two pieces of glass and composite laminate;
(2) passing the assembly through a pressure nip roll at room temperature to expel trapped air;
(3) heating the assembly via IR radiant or convective means for a short period, typically until reaching a glass surface temperature of about 100° C.;
(4) passing the hot assembly through a second pair of nip rolls to give the assembly enough temporary adhesion to seal the edge of the laminate and allow further handling and
(5) autoclaving the assembly typically at temperatures between 130–150° C. and pressures between 150–185 psig for about 30–90 minutes.

Other means for use in de-airing of the PVB/glass interfaces (steps 2–4) known in the art and are commercially practiced include vacuum bag and vacuum ring processes in which vacuum is utilized to remove the air.

The preferred embodiment of the glass laminate of the present invention comprises the following construction: outside glass sheet/outside PVB layer/embossed decorative composite/inside PVB layer/inside glass sheet. In one embodiment of the present invention, IR absorber is introduced into the inside PVB layer that is opposite the sun. In such an embodiment, the solar energy performance of the glass laminate can be optimized because the metallized film can first reflect a substantial portion of the solar energy, and that passes through the metallized film can then be absorbed by the PVB layer.

The following Examples illustrate and do not limit or restrict the invention and are illustrated using the following materials. Two rolls of biaxially oriented PET film made by Dupont-Teijin at a nominal thickness of 0.002" (51 microns) were obtained for use in the fabrication of an embossed decorative composite. This PET film substrate type had low elevated temperature shrinkage characteristics (<1.0% shrinkage after 30 minutes at 150° C.), good clarity and web handling characteristics and according to the manufacturer was particularly suited for metallizing applications.

EXAMPLE 1

Adhesion Treatment of PET Film Surface

Because the PET film did not have sufficient adhesion to PVB, one surface of each of the two rolls of PET was treated via a high vacuum "glow discharge" plasma using an argon/nitrogen gas mixture to achieve acceptable adhesion levels. Process energy input and line speed were selected to maximize PVB to PET adhesion without incurring significant yellowing of the PET film.

The 90° peel adhesion test was used to measure bond strength between plasticized PVB and PET film. Special peel adhesion laminates containing the PET film were prepared using standard laminating techniques by substituting the PET film for one glass piece of a standard double glass layered laminate.

The thickness of the plasticized PVB layer used was 0.030" (0.76 mm) and it was dried for one hour at 70° C. prior to use to reduce moisture content to ensure that the adhesion of the glass/PVB interface was higher than that of the PET/PVB interface. The treated side of the PET film was assembled to one side of the plasticized PVB sheet and a test glass layer assembled to the other side. (It is usually desirable to include a small thin (0.5 mil) untreated PET film between the treated PET and PVB layers to later facilitate the initial peeling of the PET-PVB interface.)

Two such assembled laminates were placed with untreated PET surfaces in contact with each other and passed through de-airing nip rolls. Each of the two laminates was then placed in an air oven with the PET surface facing up at 105° C. for 10 minutes. The hot laminates were re-rolled in pairs as before and then autoclaved at 143° C. at 185 psig for 30 minutes. After autoclaving, a 4 cm wide cut through the PET was made using a special double wheeled cutter. The glass at one end of the laminate was then scored and broken.

Before conducting the actual peel test, the samples were conditioned overnight at 21° C. During peel testing, the sample of glass, PVB sheet and PET film were clamped in testing grips of an Instron peel tester (cross-head speed of 12.7 cm per min) and a direct recorded measurement was made of the force necessary to separate the PET film from the PVB sheet at a 90° angle. The average of the various recorded peaks was the value for the sample. 90° peel adhesion of the treated PET surface to the PVB sheet on the final 0.004" (unembossed) decorative composite (from Example 3) was measured and found to be 25 Nt/cm on both surfaces.

EXAMPLE 2

Coating of PET Film with Aluminum

A roll of film that had been plasma treated on one surface (Example 1) was loaded into the vacuum chamber for "metallization". The pressure of the chamber was reduced using a series of vacuum pumps until the vaporization pressure of aluminum ($6.7 \times 10^{-2}$ Pa/0.5 micron Hg) was reached. At this point aluminum vaporization was initiated by electrical resistance heating of the aluminum source and aluminum was deposited onto the untreated PET surface. Deposition rates were controlled to yield a coating thickness of ~50 Angstroms.

EXAMPLE 3

Lamination of Metallized Film (→Decorative Composite)

In order to minimize the oxidation of the aluminum surface the roll of aluminum metallized film (Example 2) was laminated to the untreated surface of the second roll of PET film which had been previously adhesion promoted (Example 1). Using a conventional two ply coating/oven drying/nip roll laminating process, an isocyanate crosslinked polyester adhesive system was used to bond the aluminum coated surface of one film to the untreated surface of the other film to yield the decorative composite.

Visible transmittance of the laminated film was measured to be 31.4% using a Perkin-Elmer Lambda 900 spectrophotometer with a 150 mm diameter integrating sphere. The D65 Illuminant at 10° observer following was used for measurements.

EXAMPLE 4

Embossing

The laminated decorative composite formed in Example 3 was subjected to a nip roll embossing process that involved the use of two cylindrical rollers—one of which had a soft surface and the other one had a hard surface with an engraved texture. Two different engraved rolls were utilized for this example—one with a typical "orange peel" texture and one with a high profile "hexpin" texture. For each of the two embossing rolls the decorative composite was preheated using IR heating in order to soften the PET film and make it more compliant during the embossing process. The decorative composite was then transported through the nip and using sufficient nip roll pressure, the texture of engraved roll was imparted onto the surface forming the embossed decorative composite. Embossed decorative composites with both the "orange peel" and "hexpin" textures were made.

EXAMPLE 5

Combination with PVB Sheet

Using an encapsulation method and process conditions similar to those described in U.S. Pat. No. 5,091,258 the embossed decorative composites with hexpin pattern from Example 4 was combined with two layers of 0.015" Saflex® PVB—RB11 sheet commercially made and sold by Solutia Inc. to form an interlayer suitable for use in fabricating glass laminates.

EXAMPLE 6

Fabrication/Testing of Glass Laminates

Glass laminates were made using the interlayers formed in Example 5 using the following procedure:
  (a) The interlayer from Example 5 was conditioned for 3 hours at 99° F./23% RH to achieve an average moisture content of 0.43%.
  (b) Two 12"×12" pieces of clean annealed clear glass that were preheated in a convection oven to 105° F. were combined with the conditioned interlayer from step 1.
  (c) The hand assembled laminate was then passed through a pressure nip roll to exclude air from the two PVB-glass interfaces.
  (d) The laminate was then heated in a convection oven at 105° C. for 15 minutes and then passed again through the pressure nip roll to remove remaining air and to seal the edges of the laminate.
  (e) The laminate was then placed in an air autoclave and subjected to processing conditions typically used for PVB lamination. Process conditions were as follows: Simultaneously heat to 290° F. while increasing air pressure to 185 psig; Hold at pressure and temperature for 20 minutes; Cool to 125° F.; Reduce pressure to ambient and continue cooling to 100° F.

(f) Laminate solar properties were tested using Lambda 900 spectrophotometer with integrating sphere using D65 Illuminant at 10° observer using ISO 9050—Air Mass 2.0. Properties are summarized in Table 1 below:

TABLE 1

| Visible | % Visible Transmittance, Tv | 31.7 |
|---|---|---|
|  | % Visible Reflectance, Rv | 46.3 |
| Solar | % Solar Transmittance, Ts | 26.3 |
|  | % Solar Reflectance, Rs | 49.9 |
|  | Ratio: Tv/Ts | 1.2 |

After the solar properties were measured on this laminate a "bake test" was conducted to determine if there was any significant amount of entrapped air due to the high profile of the hexpin embossed pattern. This test consisted of heating the laminate to elevated temperatures (starting for an initial heat soak of 16 hours at 100° C. followed by continuous increases of temperature 10° C. at a time held for one hour and noting the temperature at which initial bubbles are formed. Bubbles were observed at 140° C. which is typical of laminates that have little entrapped air indicating that there is likely to be no significant performance issues attributable to entrapped air with this product construction.

EXAMPLE 7

PVB Sheet with IR Absorption Properties

PVB sheet at 0.030" thickness was made using the sheeting die extrusion process described previously and a PVB resin/plasticizer/additive formulation very similar to that employed for the commercial Saflex® RB11 PVB sheet used in Example 5 except that 0.02% of a lanthanum hexaboride fine particle dispersion in plasticizer was added to formulation prior to sheet extrusion in order to increase the IR absorption characteristics of the sheet.

EXAMPLE 8

Fabrication/Testing of Glass Laminates of Containing IR Absorber

Using the 0.030" PVB sheet formed in Example 7, 0.015" Saflex® PVB—RB17-377300 sheet—a commercial PVB sheet product with a green transparent color which is made and sold by Solutia Inc. and the embossed decorative composite with the "hexpin" texture made in Example 4 a series of glass laminates were fabricated using the following lab method:
(a) The selected PVB sheet samples were conditioned for 3 hours at 99° F./23% RH to achieve an average moisture content of 0.43%.
(b) Two pieces of clean clear annealed float glass preheated to 105° F., the conditioned PVB sheet and "hexpin" embossed decorative composite were hand assembled in order to form the embossed decorative glass laminate as shown in FIG. 1.
(c) The hand assembled laminate was then passed through a pressure nip roll to exclude air from the PVB-glass interfaces.
(d) The laminate was then heated in a convection oven at 105° C. for 15 minutes and then passed again through the pressure nip roll to remove remaining air and to seal the edges of the laminate.
(e) The laminate was then placed in an air autoclave and subjected to processing conditions typically used for PVB lamination. Process conditions were as follows: Simultaneously heat to 290° F. while increasing air pressure to 185 psig; Hold at pressure and temperature for 20 minutes; Cool to 125° F.; Reduce pressure to ambient and continue cooling to 100° F.
(f) Laminate solar properties were tested using Perkin-Elmer Lambda 900 spectrophotometer with integrating sphere using ISO 9050—Air Mass 2.0. Measurements were made with light source on both sides of the laminate in order to demonstrate the effect of first reflecting IR radiation before absorption. Properties are summarized in TABLE 2 below:

TABLE 2

|  |  | A | B |
|---|---|---|---|
| Visible | % Visible Transmittance, Tv |  | 21.1 |
|  | % Visible Reflectance, Rv | 25.4 | 24.0 |
| Solar | % Solar Transmittance, Ts |  | 11.3 |
|  | % Solar Reflectance, Rs | 26.7 | 14.9 |
|  | Tv/Ts |  | 1.9 |
|  | Solar Rejection (SR), % | 72.0 | 68.8 |
|  | Shading Coefficient (SC) | 0.31 | 0.34 |

Notes:
1. A: .030" sheet containing IR absorber furthest from light source.
2. B: .030" sheet containing IR absorber closest to light source.
3. Shading Coefficient = (Ts + 0.27* As)/0.87
4. Solar Rejection = Rs + 0.73* As As can be seen in Table 2, solar performance properties of shading coefficient and solar rejection—are improved if the IR absorber is located furthest from the light source. Furthermore, the use of the green RB 17 interlayer on one side of the laminate resulted in a noticeable change in color for the laminate when observed from that side.

The preceding description is set forth for purposes of illustration only and is not to be taken in a limited sense. Various modifications and alterations will be readily apparent to persons skilled in the art. It is intended, therefore, that the foregoing be considered as exemplary only and that the scope of the invention be ascertained from the following claims.

I claim:

1. An interlayer for laminated glass, the interlayer comprising an embossed decorative composite disposed between a first and a second adhesive layer, wherein each of the first and second adhesive layers have one surface conforming to the embossed decorative composite; wherein the embossed decorative composite comprises a first embossed polymeric support film having a metal coating disposed on one side of the first embossed polymeric support film, wherein the first polymeric support film is bonded to a second embossed polymeric support film such that the embossed metal coating is between the two embossed polymeric support films, wherein the bonded polymeric support films and metal coating are embossed such that each surface thereof protrudes at different angles to the flat plane of the bonded polymeric support films.

2. The interlayer of claim 1, wherein the embossed decorative composite has a visible light transmittance ranging from about 2% to about 70%.

3. The interlayer of claim 1, wherein the metal coating is selected from the group consisting of silver, aluminum, chromium, nickel, zinc, copper, tin, gold, brass, stainless steel, and alloys thereof.

4. The interlayer of claim 3, wherein the metal coating is aluminum.

5. The interlayer of claim 1, wherein the embossing has a regular diamond, hexpin, or random orange peel pattern.

6. The interlayer of claim 1, wherein the first and the second polymeric support films are individually selected from the group consisting of nylons, polyurethanes, acrylics, polycarbonates, cellulose acetates, cellulose triacetates, vinyl chloride polymers, vinyl chloride copolymers, and biaxially stretched polyethylene terephthalate.

7. The interlayer of claim 6, wherein the first and the second polymeric support films are biaxially stretched polyethylene terephthalate.

8. The interlayer of claim 1, wherein the first and the second polymeric support films are bonded with an adhesive.

9. The interlayer of claim 8, wherein the adhesive is stable at temperatures up to about 150° C.

10. The interlayer of claim 8, wherein the adhesive is a crosslinked polyester, a crosslinked urethane, or a crosslinked acrylic.

11. The interlayer of claim 10, wherein the crosslinked polyester is an isocyanate crosslinked polyester.

12. The interlayer of claim 1, wherein the first and the second polymeric support layers have a thickness of about 0.025 to about 0.075 mm (about 1 to 3 mils).

13. The interlayer of claim 1, wherein the first and the second adhesive layers are individually selected from the group consisting of polyurethane, ethylene vinyl acetate copolymer, plasticized polyvinyl chloride and plasticized polyvinyl butyral.

14. The interlayer of claim 13 wherein the first and the second adhesive layers are plasticized polyvinyl butyral.

15. The interlayer of claim 14, wherein the plasticized polyvinyl butyral is plasticized with a plasticizer selected from the group consisting of triethylene glycol di-(2-ethylbutyrate), triethyleneglycol di-(2-ethylhexanoate), tetraethyleneglycol diheptanoate, dihexyl adipate, dioctyl adipate, mixtures of heptyl and nonyl adipates, dibutyl sebacate, polymeric plasticizers, and mixtures of phosphates and adipates, mixtures of adipates and alkyl benzyl phthalates, mixed adipates made from $C_4$ to $C_9$ alkyl alcohols and cyclo $C_4$ to $C_{10}$ alcohols, $C_6$ to $C_8$ adipate esters, and mixtures thereof.

16. The interlayer of claim 1, wherein one or both of the first and the second adhesive layers comprise a light stable pigment.

17. The interlayer of claim 1, wherein one or both of the first and the second adhesive layers comprise an infrared light absorber.

18. The interlayer of claim 17, wherein the infrared light absorber is selected from the group consisting of antimony doped tin oxide, tin doped indium oxide, a metal hexaboride, or combinations thereof.

19. The interlayer of claim 18 wherein the metal hexaboride is lanthanum hexaboride (LaB6).

20. The interlayer of claim 1, wherein one or both of the first and the second adhesive layers comprise an ultra-violet light absorber.

21. The interlayer of claim 1 wherein the first and the second adhesive layers have a thickness of about 0.38 to 1.5 mm.

22. The interlayer of claim 1, wherein the surface of the polymeric support layers in contact with the adhesive layers are chemically modified using a process selected from the group consisting of flame treatment, chemical oxidation, corona discharge, carbon sputtering, plasma treatment in vacuum, and plasma treatment in air.

23. The interlayer of claim 1, wherein an adhesive is applied to the surface of the polymeric support layers in contact with the adhesive layers.

24. A laminated glass composite comprising an interlayer disposed between two glass sheets, the interlayer comprising an embossed decorative composite disposed between a first and a second adhesive layer, wherein each of the first and second adhesive layers have one surface conforming to the embossed decorative composite; wherein the embossed decorative composite comprises a first embossed polymeric support film having a metal coating disposed on one side of the first embossed polymeric support film, wherein the first polymeric support film is bonded to a second embossed polymeric support film such that the embossed metal coating is between the two embossed polymeric support films, wherein the bonded polymeric support films and metal coating are embossed such that each surface thereof protrudes at different angles to the flat plane of the bonded polymeric support films.

25. The laminated glass composite of claim 24, wherein the two glass sheets are a pair of matching float glass sheets.

26. The laminated glass composite of claim 24, wherein the two glass sheets are individually selected from the group consisting of clear glass, tinted glass, annealed glass, heat strengthened glass, and tempered glass.

27. The laminated glass composite of claim 24, wherein the embossed decorative composite has a visible light transmittance ranging from about 2% to about 70%.

28. The laminated glass composite of claim 24, wherein the metal coating is selected from the group consisting of silver, aluminum, chromium, nickel, zinc, copper, tin, gold, brass, stainless steel, and alloys thereof.

29. The laminated glass composite of claim 28, wherein the metal coating is aluminum.

30. The laminated glass composite of claim 24, wherein the embossing has a regular diamond, hexpin, or random orange peel pattern.

31. The laminated glass composite of claim 24, wherein the first and the second polymeric support films are individually selected from the group consisting of nylons, polyurethanes, acrylics, polycarbonates, cellulose acetates, cellulose triacetates, vinyl chloride polymers, vinyl chloride copolymers, and biaxially stretched polyethylene terephthalate.

32. The laminated glass composite of claim 31, wherein the first and the second polymeric support films are biaxially stretched polyethylene terephthalate.

33. The laminated glass composite of claim 24, wherein the first and the second polymeric support films are bonded with an adhesive.

34. The laminated glass composite of claim 33, wherein the adhesive is stable at temperatures up to about 150° C.

35. The laminated glass composite of claim 33, wherein the adhesive is a crosslinked polyester, a crosslinked urethane, or a crosslinked acrylic.

36. The laminated glass composite of claim 35, wherein the crosslinked polyester is an isocyanate crosslinked polyester.

37. The laminated glass composite of claim 24, wherein the first and the second polymeric support layers have a thickness of about 0.025 to about 0.075 mm (about 1 to 3 mils).

38. The laminated glass composite of claim 24, wherein the first and the second adhesive layers are individually selected from the group consisting of polyurethane, ethylene vinyl acetate copolymer, plasticized polyvinyl chloride and plasticized polyvinyl butyral.

39. The laminated glass composite of claim 38 wherein the first and the second adhesive layers are plasticized polyvinyl butyral.

40. The laminated glass composite of claim 39, wherein the plasticized polyvinyl butyral is plasticized with a plasticizer selected from the group consisting of triethylene glycol di-(2-ethylbutyrate), triethyleneglycol di-(2-ethylhexanoate), tetraethyleneglycol diheptanoate, dihexyl adipate, dioctyl adipate, mixtures of heptyl and nonyl adipates, dibutyl sebacate, polymeric plasticizers, and mixtures of phosphates and adipates, mixtures of adipates and alkyl benzyl phthalates, mixed adipates made from $C_4$ to $C_9$ alkyl alcohols and cyclo $C_4$ to $C_{10}$ alcohols, $C_6$ to $C_8$ adipate esters, and mixtures thereof.

41. The laminated glass composite of claim 24, wherein one or both of the first and the second adhesive layers comprise a light stable pigment.

42. The laminated glass composite of claim 24, wherein one or both of the first and the second adhesive layers comprise an infrared light absorber.

43. The laminated glass composite of claim 42, wherein the infrared light absorber is selected from the group consisting of antimony doped tin oxide, tin doped indium oxide, a metal hexaboride, or combinations thereof.

44. The laminated glass composite of claim 43 wherein the metal hexaboride is lanthanium hexaboride (LaB6).

45. The laminated glass composite of claim 24, wherein one or both of the first and the second adhesive layers comprise an ultra-violet light absorber.

46. The laminated glass composite of claim 24 wherein the first and the second adhesive layers have a thickness of about 0.38 to 1.5 mm (about 15–60 mils).

47. The laminated glass composite of claim 24, wherein the surface of the polymeric support layers in contact with the adhesive layers are chemically modified using a process selected from the group consisting of flame treatment, chemical oxidation, corona discharge, carbon sputtering, plasma treatment in vacuum, and plasma treatment in air.

48. The laminated glass composite of claim 24, wherein an adhesive is applied to the surface of the polymeric support layers in contact with the adhesive layers.

49. A laminated glass composite comprising an interlayer disposed between an outer glass sheet and an inner glass sheet, the interlayer comprising an embossed decorative composite disposed between an outer and an inner adhesive layer, wherein each of the inner and outer adhesive layers have one surface conforming to the embossed decorative composite, the inner adhesive layer comprising an infra-red absorber and both adhesive layers comprising a UV absorber, wherein the outer adhesive layer is bonded to the outer glass sheet and the inner adhesive layer is bonded to the inner glass sheet; wherein the embossed decorative composite comprises a first embossed polymeric support film having a metal coating disposed on one side of the first embossed polymeric support film, wherein the first polymeric support film is bonded to a second embossed polymeric support film such that the embossed metal coating is between the two embossed polymeric support films, wherein the bonded polymeric support films and metal coating are embossed such that each surface thereof protrudes at different angles to the flat plane of the bonded polymeric support films.

* * * * *